June 19, 1973   A. J. AGOSTINELLI   3,740,262
DUAL FINISH SURGEON'S GLOVE AND METHOD OF MAKING SAME
Filed Aug. 17, 1971
2 Sheets-Sheet 1
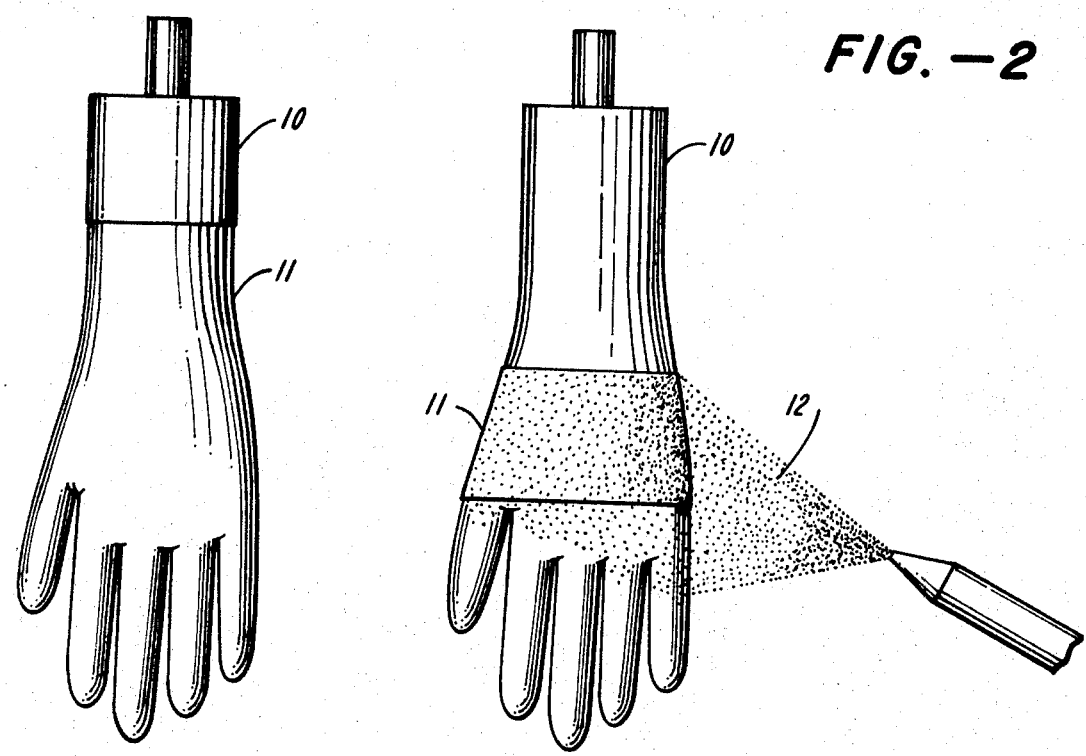
FIG.—1
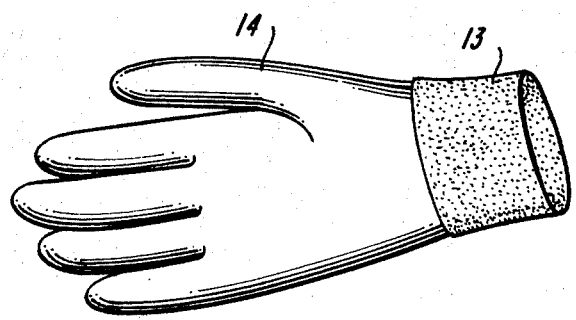
FIG.—3

United States Patent Office 3,740,262
Patented June 19, 1973

3,740,262
DUAL FINISH SURGEON'S GLOVE AND
METHOD OF MAKING SAME
Armand J. Agostinelli, East Haven, Conn., assignor to
Dart Industries Inc., Los Angeles, Calif.
Continuation-in-part of application Ser. No. 877,848, Nov.
18, 1969, which is a continuation-in-part of application
Ser. No. 720,854, Apr. 12, 1968, both now abandoned.
This application Aug. 17, 1971, Ser. No. 172,568
Int. Cl. B44d 1/02
U.S. Cl. 117—94                                 12 Claims

ABSTRACT OF THE DISCLOSURE

A method for manufacturing a latex article particularly a latex surgeon's glove. The article has a powder attracting surface and a powder rejecting surface. The powder rejecting surface is free from stickiness and tackiness yet is not slippery. The method includes the steps of: depositing a latex film on a form for the article; curing the film and contacting the surface which is to be powder rejecting with a solution containing a predetermined number of parts per million of a halogen for a predetermined time.

---

This application is a continuation-in-part of copending application, Ser. No. 877,848, filed Nov. 18, 1969, which is in turn a continuation-in-part of application Ser. No. 720,854, filed Apr. 12, 1968 both now abandoned.

This invention relates generally to rubber articles and methods of making them. More specifically, it relates to a process for manufacting a latex article, such as a new rubber surgeon's glove, having one surface with characteristics different from another surface of the article.

Surgeon's gloves formed from rubber by the conventional techniques have a natural tackiness that causes clinging to the hand and fingers and making donning the gloves difficult. To overcome this problem, it is customary to "dust" the gloves with an anti-friction lubricating powder or dust such as corn starch, which serves as a surface lubricant. This anti-friction lubricating powder is commonly placed upon the rubber surgeon's gloves from the hand shaped form upon which they are formed by dipping and curing. Inasmuch as the gloves are turned inside out as they are stripped, the application of dust to the exterior surface eliminates binding due to cohesion as the glove is stripped.

Even though the gloves and the lubricating powder which has been applied to them are sterilized before use, nevertheless, a possibility of inducing granuloma exists if the lubricating powders are brought into contact with a surgical opening. Therefore, it is highly desirable to eliminate as much powder as possible on the external surface of a surgeon's glove. To this end, gloves are customarily tumbled or vibrated after the application of lubricating powder in an attempt to remove excess powder from the external surfaces thereof. However, due to surface tackiness, a substantial amount of the powder remains and cannot be removed. Even rinsing of the outside surfaces of the gloves in sterile alcohol, water or saline solutions will not remove all the powder accumulated on the glove surfaces.

It was known in the prior art that the surfaces of a rubber glove could be halogenated to make them slippery; however, slippery surfaces on a surgeon's gloves are unacceptable since the glove must not increase the possibility of causing instruments to slip from the fingers. Furthermore, a slippery inside surface on a surgeon's glove will not readily accept the lubricants which are necessary to permit donning of the gloves.

Accordingly, it is an object of this invention to provide a method for manufacturing a surgeon's glove having a lubricated internal surface and a substantially lubricant free external surface.

A still further object of the invention is the provision in the manufacturing of surgeon's gloves for introducing lubricating powders to one surface of the glove only.

Another object of the invention is to provide a method for manufacturing a latex article having a powder holding surface and a powder rejecting surface, the powder rejecting surface being free from tack and slipperiness.

Another object of the invention is to provide a method for making a novel surgeon's glove having a powder holding interior surface and a powder rejecting exterior surface, the exterior surface being free from tack and slipperiness.

These and other objects of the invention will be apparent from the following detailed description thereof and the accompanying drawings wherein:

FIG. 1 is a schematic view showing a surgeon's glove as initially shaped on a form therefore;

FIG. 2 is another schematic view showing the surgeon's glove being stripped from a form; and, FIG. 3 is a perspective view of the stripped surgeon's glove showing a cuffed portion to expose the interior surface.

Figure 4:
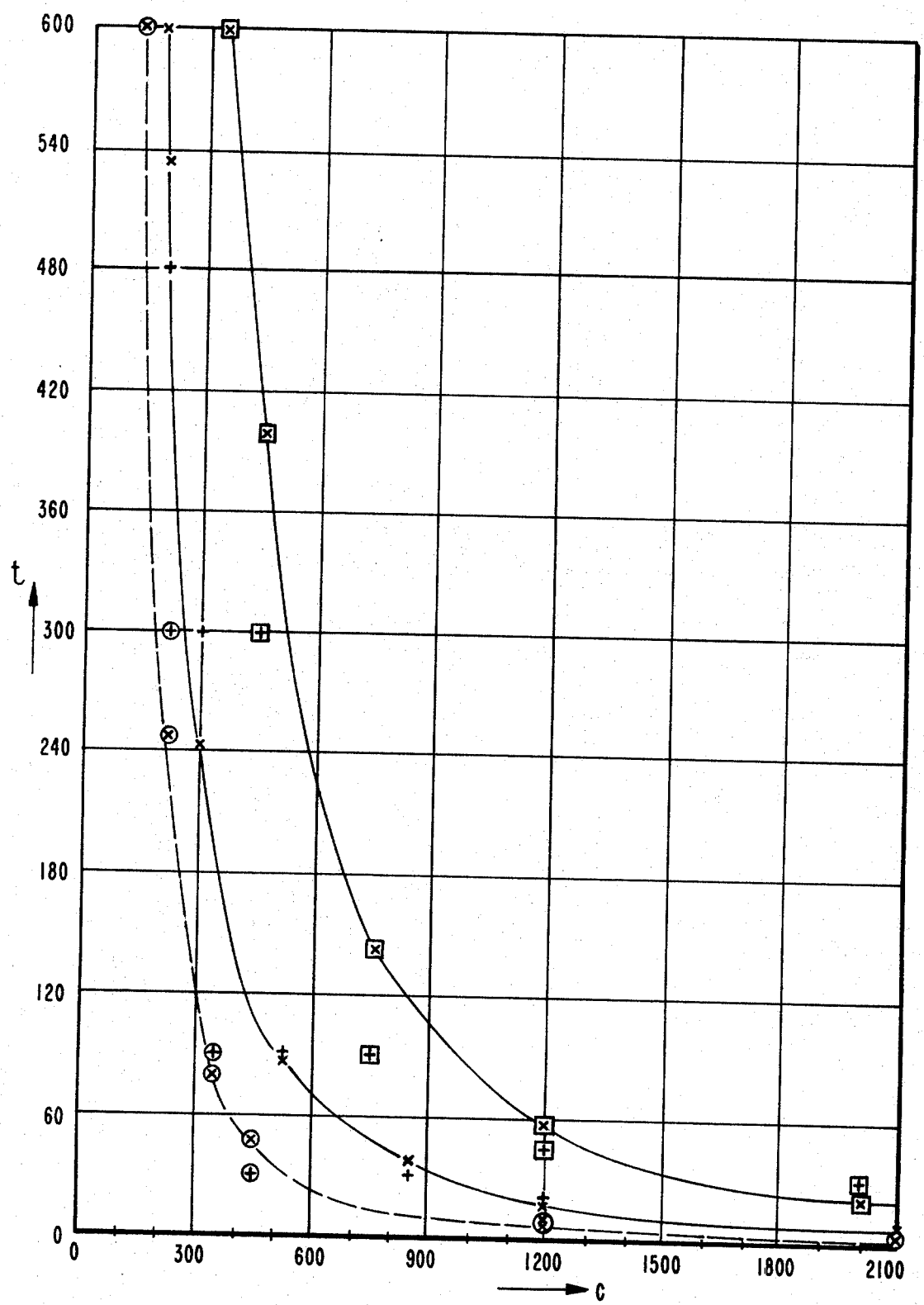
FIG. 4 is a graph showing the approximate relationship between chlorine concentrations in water and time immersion of the latex article in the water to obtain a latex article in accordance with this invention.

Referring now to the drawings, latex articles, in particular, surgeon's gloves, are formed by first dipping the hand-shaped form 10 in a coagulant for natural rubber latex and then dipping the form in a rubber latex solution for a time sufficient to form a glove 11 of the desired thickness thereon.

Following the dipping procedure, various treatments such as reaching of the gloves may be conducted and then the gloves are allowed to dry.

While still on the form, the gloves are, according to the invention, halogenated with chlorine, fluorine, bromine or iodine to change the surface characteristics sufficiently so that lubricating dust will not adhere to the surface. Due to the deleterious effects that overhalogenation can have upon rubber articles, the step must be rather precisely controlled to halogenate the surface only to the extent that is necessary to produce a surface to which lubricating powders will not adhere. This is done according to the preferred method of the invention by introducing the glove on the form into a halogen containing solution. In this manner, the amount of halogenation of the surface of the formed rubber glove can be accurately controlled by the length of the dip time and the concentration of halogenating constituents. The preferred halogenating constituents are those selected from the group consisting of chlorine and bromine, and when employing a dip time of from about 15 to about 90 seconds, 1000–2000 p.p.m. of these constituents may be used successfully. As will be subsequently discussed varying dip times and concentrations of halogen may be used provided specific relationships between the type of halogen, the temperature, the concentration of halogen and the immersion time are met.

Following the dipping of the glove's surface, the glove can be rinsed if necessary to remove excess materials and then dried.

The resulting article has a powder holding inside surface and a powder rejecting outside surface which is free from tack and slipperiness. It is believed that the slight halogenation resulting from the inventive method causes the outside surface to reject powder and to become tack free. The minimal halogenation does not appear to effect an increase in slipperiness nor does the slight halogenation appear to adversely effect the aging properties of the latex article.

During the stripping operation, as depicted in FIG. 2, a lubricating or dusting powder 12 is applied to the glove 11. The common dusting powder used is a sterilizable corn starch of the type that is biologically absorbable and suitable for the purpose of lubricating surgeon's gloves. When the glove is stripped, it is turned outside in. After the stripping operation, the glove is reversed to its normal position and tumbled to remove the lubricating powder from the outside thereof. The resulting article is a surgeon's glove as shown in FIG. 3 with a dusted inside surface 13 and a substantially dust free outside surface which is free from tack and slipperiness. The resulting glove will have the amount of lubricating powder on the external surface reduced to substantially less than 0.015 gram to between about 0.002 and 0.008 gram. What little dusting powder remains can be readily removed by rinsing in a sterile saline, water or alcohol solution as often is prescribed for pre-operative procedures.

The following specific examples and discussion of process conditions and relationships illustrate the invention and specific conditions that can be used to make a dual finished latex article such as a surgeon's glove:

EXAMPLE NO. 1

A number of surgeon's gloves are prepared by dipping forms into a compounded natural rubber latex mixture in accordance with conventional procedures.

The mixture has the following composition:

| Constituents: | Parts by weight |
|---|---|
| Latex solids | 100 |
| Sulfur | 1 |
| Zinc oxide | ½ |
| Zinc salt of mercapto benzothiazole | 1 |
| Zinc dimethyldithiocarbamate | ¼ |
| 4,4'-thiobix (6-tert-butyl-m-cresol) | ½ |
| Water sufficient to bring total solids to about 45 percent. | |

The gloves are then permitted to cure on their form. One of the forms with the surgeon's glove is then dipped for a period of 8 minutes in an aqueous solution containing 200 p.p.m. chlorine gas at about 20° C.

The glove is permitted to dry. Then it is dusted and stripped, tumbled to remove excess dust and then turned right side out. The glove is tumbled again in the presence of an air jet to remove excess dust from the outside surface. Inspection indicates that the inside of the glove has sufficient lubricating powder adhering thereto to facilitate donning, while the exterior surface of the glove is not slippery, yet is substantially free of dusting particles.

EXAMPLE NO. 2

The procedure of Example 1 is followed except the glove is dipped for a period of 5 minutes in an aqueous solution containing 450 p.p.m. chlorine gas. The resulting gloves are subjected to the post dip treatment of Example 1 and the finished glove likewise has sufficient lubricating powder on the interior surface to facilitate donning while the exterior surface is substantially free from a slippery feel but has slightly more slip than the glove prepared in Example 1. The glove is likewise substantially free of lubricating particles.

EXAMPLE NO. 3

The procedure of Example 1 is followed except the glove is exposed to 200 p.p.m. of chlorine gas in an aqueous solution for five minutes. The resulting glove has more powder remaining on the exterior surface than the glove manufactured in accordance with example; however, the resulting glove has substantially less powder on the exterior surface than an untreated glove. The glove has a non-slippery surface with very slight residual tack.

EXAMPLE NO. 4

The procedure of Example 1 is followed except the glove is exposed to 300 p.p.m. chlorine in aqueous solution for five minutes. The resulting glove has substantially no powder on the exterior surface. The exterior surface is not slippery to the touch.

EXAMPLE NO. 5

The procedure of Example 1 is followed except the glove is exposed to 750 p.p.m. chlorine in aqueous solution for 1½ minutes. The resulting glove has very little lubricating powder on the resulting exterior surface. The exterior surface is very slightly slippery.

EXAMPLE NO. 6

The procedure of Example 1 is followed except the glove is exposed to 350 p.p.m. chlorine in aqueous solution for 1½ minutes. The resulting glove has an exterior surface which is non-slippery, and powder rejecting. The surface does however hold slightly more lubricating powder than the glove prepared in accordance with Examples 1 and 4.

EXAMPLE NO. 7

The procedure of Example 1 is followed except the glove is exposed to 525 p.p.m. of chlorine in aqueous solution for 90 seconds. The resulting glove has a non-slippery, powder rejecting exterior surface.

EXAMPLE NO. 8

The procedure of Example 1 is followed except the glove is exposed to 450 p.p.m. of chlorine gas in aqueous solution for thirty seconds. The resulting glove has a non-slippery powder rejecting exterior surface. The exterior surface does however hold slightly more lubricating powder than the gloves prepared in accordance with Examples 1, 4 and 7.

EXAMPLE NO. 9

The procedure of Example 1 is followed except the glove is exposed to 750 p.p.m. of chlorine gas in aqueous solution for 30 seconds. The resulting glove has a non-slippery powder rejecting exterior surface.

EXAMPLE NO. 10

The procedure of Example 1 is followed except the glove is exposed to 1200 p.p.m. chlorine in aqueous solution for a period of twenty seconds. The resulting glove has a non-slippery powder rejecting exterior surface.

EXAMPLE NO. 11

The procedure of Example 1 is followed except the glove is exposed to 1200 p.p.m. chlorine in aqueous solution for a period of eight seconds. The resulting glove has a non-slippery powder rejecting exterior surface. The exterior surface does however hold slightly more powder than the glove prepared in Example 10.

EXAMPLE NO. 12

The procedure of Example 1 is followed except the glove is exposed to 1200 p.p.m. chlorine gas in aqueous solution for a period of 45 seconds. The resulting glove has a powder rejecting substantially non-slippery exterior surface. The glove does however have a slightly more slippery feel than the glove prepared in Example 10.

EXAMPLE NO. 13

The procedure of Example 1 is followed except the glove is exposed to 2000 p.p.m. chlorine in aqueous solution for a period of 30 seconds. The resulting glove has a powder rejecting substantially non-slippery exterior surface. The glove does however have a slightly more slippery surface than the glove prepared in Example 1.

EXAMPLE NO. 14

The procedure of Example 1 is followed except the glove is exposed to 3500 p.p.m. of bromine in aqueous solution for 15 seconds. The resulting glove has a non-slippery powder rejecting exterior surface.

EXAMPLE NO. 15

The procedure of Example 1 is followed except the glove is exposed to 100,000 p.p.m. iodine in aqueous solution for 30 seconds. The resulting glove has a non-slippery powder rejecting exterior surface.

EXAMPLE NO. 16

The procedure of Example 1 is followed except the glove is exposed to 280 p.p.m. chlorine in aqueous solution at a temperature of about 43° C. for 60 seconds. The resulting glove has a non-slippery, powder rejecting exterior surface.

Examples 1 through 13 are all performed for chlorine at a temperature of about 20° C. and will be used to illustrate how upper and lower limits for time of exposure and the approximate preferred time of exposure of the latex article to the halogen fluid system may be determined.

Examples 1, 4, 7, 9 and 10 set out exposure times and chlorine concentrations which permit the formation of a latex surgeon's glove which has a powder rejecting and a slip resistant surface. The following data can be obtained from these examples for the variation of exposure time $t$ with a change in concentration C.

| | C in p.p.m. | $t$ in seconds |
|---|---|---|
| Example: | | |
| 1 | 200 | 480 |
| 4 | 300 | 300 |
| 7 | 525 | 90 |
| 9 | 750 | 30 |
| 10 | 1,200 | 20 |

C is plotted on the independent axis in FIG. 4 and $t$ is plotted on the dependent axis. Points determined by the above coordinates are represented by the symbol +.

An equation for the curve determined by the above co-ordinates is estimated by "least squares fit."

The curve having the best fit which is also compatible with known physical relationships, for example, having no values for $t$ which are negative, has the general formula:

$$t \cong A/C^B$$

For the particular curve resulting from the above co-ordinates A has the approximate value $1.14 \times 10^7$ and B has the approximate value 1.92.

A comparison of actual $t$'s with $t$'s estimated by the above formula is as follows:

| C actual | $t$ actual | $t$ estimated |
|---|---|---|
| 200 | 480 | 533 |
| 300 | 300 | 245 |
| 525 | 90 | 83 |
| 750 | 30 | 42 |
| 1,200 | 20 | 17 |

The points determined by C actual and $t$ estimated are likewise plotted in FIG. 4 and are represented by the symbol X. It can be seen that the curve estimated from the formula has a fairly close correlation with actual points.

Similarly, Examples 3, 6, 8 and 11 set out exposure times and chlorine concentrations which permit the formation of a latex surgeon's glove which has a powder rejecting and slip resistant surface. The data in these examples, however, approximately define a lower limit for $t$ since any substantial reduction of time in these examples will result in an unacceptable glove due to the fact that sufficient halogen will not have reacted with the surface of the glove to make the surface reject sufficient lubricating powder.

The following data can be obtained from these examples:

| | C in p.p.m. | $t_1$ in seconds |
|---|---|---|
| Example: | | |
| 3 | 200 | 300 |
| 6 | 350 | 90 |
| 8 | 450 | 30 |
| 11 | 1,200 | 8 |

C is again plotted on the independent axis and the lower time limit $t_1$ is plotted on the dependent axis. The points determined by the above co-ordinates are represented by the symbol ⊕.

An equation for the curve determined by the lower time limit co-ordinates is again estimated by "least square fit" and the general formula $t_1 = A_1/C^{B_1}$ is again selected as the most approximate.

For the particular curve resulting from the above lower time limit co-ordinates $A_1$ has the approximate value $1.11 \times 10^7$ and $B_1$ has the approximate value 2.02.

A comparison of actual $t_1$ with $t_1$ estimated by the above formula is as follows:

| C actual | $t_1$ actual | $t_1$ estimated |
|---|---|---|
| 200 | 300 | 249 |
| 350 | 90 | 80 |
| 450 | 30 | 48 |
| 1,200 | 8 | 7 |

The points determined by C actual and $t_1$ estimated are plotted in FIG. 4 and are represented by the symbol ⊗.

The reaction between a halogen and a molecule of latex rubber can reasonably be considered a second order reaction having a rate which is proportional to the square of the concentration of halogen and a time of reaction which is inversely proportional to the square of the halogen concentration assuming that the concentration of rubber remains constant.

In the formula:

$$t \cong \frac{A}{C^B}$$

it can therefore be reasonably assumed that $B \cong 2$ and the formula becomes:

$$t = \frac{A}{C^2}$$

and a rough approximation of A for a given set of conditions can be made from a single point.

Examples 2, 5, 12 and 13 set out exposure times and chlorine concentrations which permit the formation of a latex surgeon's glove which has a powder rejecting and substantially slip resistant surface. These examples are however close to the upper time limit $t_2$ in that increasing exposure time to any substantial extent will result in an article having an unacceptably slick surface.

Examples 2, 5, 12 and 13 will be used to illustrate an alternate method for obtaining a rough approximation of the formula for the curve.

The data from these examples approximately defining the upper limit for $t_2$ is as follows:

| | C in p.p.m. | $t_2$ in seconds |
|---|---|---|
| Example: | | |
| 2 | 450 | 300 |
| 5 | 750 | 90 |
| 12 | 1,200 | 45 |
| 13 | 2,000 | 30 |

Assuming $$t_2 = \frac{A_2}{C^2}$$

as previously discussed, A can be calculated by substantially known values of C and $t_2$ taken from the above examples. The resulting mean value for A is approximately $8 \times 10^7$.

Known and estimated values for $t_2$ are plotted in FIG. 4 and are represented by the symbol ⊕ and ⊗ respectively.

Either the general formula $$t = \frac{A}{C^B}$$

or the shortened formula $$t = \frac{A}{C^2}$$

may likewise be used for various temperatures and different halogens by determining the constants from experimental data.

For example, from Example 14 for Bromine C=3500 parts per million (p.p.m.) and t=15 seconds.

Substituting in the formula:

$$t \cong \frac{A}{C^2}$$

$$15 \cong \frac{A}{3500^2}$$

$$A \cong 1.8 \times 10^8$$

Values of A for lower limit $t_1$ and upper limit $t_2$ can likewise be obtained by experimentally reducing the exposure time until powder begins to cling to the surface. The value for this time $t_1$ is then substituted in the above equation and the equation is solved for $A_1$. Similarly the exposure time can be increased until the surface begins to feel slippery. The resulting time $t_2$ is substituted in the above equation and the equation is solved for $A_2$ thus the approximate curves for both upper and lower limits of exposure time are obtained or Numerous experimental points are obtained on both the upper and lower limit curves and a more precise equations are obtained by using least squares fit to obtain accurate values for A and B in the general equation $t = A/X^B$.

Values for A and B can be similarly calculated for changes in temperature.

In effect, the above equations simply assist in predetermining the dip time in a known concentration of a known halogen or mixture of halogens at a fixed temperature so that the surface of the latex rubber dipped will be halogenated sufficiently to reject powder yet will not be halogenated sufficiently to become slippery. It has been discovered and disclosed herein that there exists a minimum time of exposure of latex rubber to halogen under a given set of conditions which will permit the exposed latex surface to reject lubricating powder and a maximum time of exposure of latex rubber to halogen under a given set of conditions beyond which the latex surface becomes slippery. Once the disclosure is made, it is clear that one skilled in the art can experimentally determine the proper conditions which will be between the maximum and minimum exposure limits without using the formulas described herein. This invention therefore includes any process wherein a rubber latex surface is exposed to a halogen containing fluid, whether gas or liquid, for a sufficient period of time to cause the surface of the latex rubber to become powder rejecting and for an insufficient period of time to cause the surface to become slippery.

What is claimed is:

1. A method for manufacturing a powdered latex surgeon's glove having a powder rejecting surface and a powder retaining surface said powder rejecting surface being free from tack and being slip resistant, comprising:

contacting the surface of a latex surgeon's glove which is to be powder rejecting with a fluid comprising a halogen selected from the group consisting of fluorine, chlorine, bromine, and iodine until said surface becomes powder rejecting;

ceasing to contact said powder rejecting surface with said fluid before said surface becomes slippery; and contacting said surgeon's glove with lubricating powder.

2. A method for manufacturing a powdered latex surgeon's glove having a powder rejecting surface, and a powder retaining surface said powder rejecting surface being free from tack and being slip resistant, said method comprising:

contacting the surface which is to be powder rejecting with a fluid comprising concentration C of halogen for a time $t$ wherein $t$ may vary between a lower limit $t_1$ below which there has not been sufficient contact of the surface with the halogen to cause the surface to become sufficiently powder rejecting and upper limit $t_2$ above which the surface has been overexposed to halogen so that the surface begins to feel slippery wherein $t_1$ and $t_2$ are approximately defined as follows:

$$t_1 \cong \frac{A_1}{C^{B_1}}$$

and $$t_2 \cong \frac{A_2}{C^{B_2}}$$

wherein $A_1$, $A_2$, $B_1$ and $B_2$ are experimentally determinable constants; and contacting said surgeon's glove with lubricating powder.

3. The method of claim 2 wherein $B_1$ and $B_2$ are each equal to about 2 and $A_1$ and $A_2$ are experimentally determinable constants at least partially dependent upon temperature, energy of activation and units conversion.

4. The method of claim 2 wherein said halogen is bromine in a concentration of about 3500 parts per million in water at a temperature of about 20° C. and $t$ equals about 15 seconds.

5. The method of claim 2 wherein said halogen is iodine in a concentration of about 100,000 parts per million in water at a temperature of about 20° C. and $t$ equals about 30 seconds.

6. The method of claim 2 wherein said halogen is chlorine in a concentration of about 280 parts per million in water at a temperature of about 43° C. and $t$ equals about 60 seconds.

7. The method of claim 3 wherein said halogen is chlorine and $$A_1 \cong 1 \times 10^7$$

and $$A_2 \cong 8 \times 10^7$$

at a temperature of about 20° C., and $t_1$ and $t_2$ are in seconds and C is in parts per million in water.

8. The method of claim 7 wherein $t$ equals about 480 seconds and C equals about 200 parts per million in water.

9. The method of claim 7 wherein $t$ equals about 300 seconds and C equals about 300 parts per million in water.

10. The method of claim 7 wherein $t$ equals about 90 seconds and C equals about 525 parts per million in water.

11. The method of claim 7 wherein $t$ equals about 30 seconds and C equals about 750 parts per million in water.

12. The method of claim 7 wherein $t$ equals about 20 seconds and C equals about 1200 parts per million in water.

References Cited
UNITED STATES PATENTS

| | | | |
|---|---|---|---|
| 2,260,143 | 10/1941 | Juve | 117—47 R |
| 2,621,333 | 12/1952 | Thomas et al. | 117—169 R |
| 3,460,975 | 8/1969 | Stebleton | 117—94 |
| 3,637,411 | 1/1972 | Agostinelli | 117—94 X |

EDWARD G. WHITBY, Primary Examiner

U.S. Cl. X.R.

2—159, 168; 117—19, 29, 138.8 R, 138.8 UF, 169 R, 161 R